US012668465B2

(12) United States Patent
Forté et al.

(10) Patent No.: US 12,668,465 B2
(45) Date of Patent: Jun. 30, 2026

(54) LINEAR ACTUATOR

(71) Applicant: GESTION LAFOREST INC., St-Hubert (CA)

(72) Inventors: Alain Forté, Boucherville (CA); Pierre Laforest, Brossard (CA); Alain Gobeil, Montréal (CA)

(73) Assignee: GESTION LAFOREST INC., St-Hubert (CA)

( * ) Notice: Subject to any disclaimer, the term of this patent is extended or adjusted under 35 U.S.C. 154(b) by 347 days.

(21) Appl. No.: 18/551,697

(22) PCT Filed: May 20, 2021

(86) PCT No.: PCT/CA2021/050684

§ 371 (c)(1),
(2) Date: Sep. 21, 2023

(87) PCT Pub. No.: WO2022/241535

PCT Pub. Date: Nov. 24, 2022

(65) Prior Publication Data

US 2024/0182281 A1 Jun. 6, 2024

(51) Int. Cl.
*B66F 7/28* (2006.01)
*B66F 3/44* (2006.01)

(52) U.S. Cl.
CPC .................. *B66F 7/28* (2013.01); *B66F 3/44* (2013.01); *B66F 2700/025* (2013.01); *B66F 2700/123* (2013.01)

(58) Field of Classification Search
CPC .... B66F 11/00; B66F 3/44; B66F 7/28; B66F 2700/123; B66F 2700/025
See application file for complete search history.

(56) References Cited

U.S. PATENT DOCUMENTS

| | | | | |
|---|---|---|---|---|
| 7,213,796 | B2 | 5/2007 | LaForest | |
| 2006/0005651 | A1* | 1/2006 | Laforest .................. | B66F 11/00 74/425 |
| 2017/0001314 | A1* | 1/2017 | Yim .......................... | B25J 18/02 |

OTHER PUBLICATIONS

Written Opinion of the International Searching Authority dated Feb. 14, 2022.

* cited by examiner

*Primary Examiner* — Seahee Hong
(74) *Attorney, Agent, or Firm* — Jacob M. Ward; Ward Law Office LLC

(57) ABSTRACT

The linear actuator comprises upper and lower frame portions vertically movable relative to one another along a central axis, and first and second bands that intertwine to form an extractable and retractable column. The second band forms the wall of the vertical column, and it is the second band that is supported by a rotor that is rotatably carried by the lower frame portion, to reduce the mechanical stress on the first band.

10 Claims, 8 Drawing Sheets

LINEAR ACTUATOR

FIELD OF THE INVENTION

The present invention relates to linear actuators of the type that use a pair of intertwined bands to form an extractable and retractable column.

BACKGROUND OF THE INVENTION

It is known to use linear actuators that have an extractable and retractable telescopic column formed of interconnected helical bands, to displace loads. This kind of device is mainly, although not exclusively, used for lifting and lowering loads, and in such a case the telescopic column is consequently formed vertically.

One such prior art linear actuator 20 is shown in the enclosed FIGS. 6-8. Linear actuator 20 comprises a hollow cylindrical rotor 22 rotatably carried over a base 24 by means of ball bearings 45*a*, 45*b*. Base 24 is destined to be fixed to the ground (e.g. bolted). A motor 26 selectively rotates the rotor 22 by means of a gear wheel 28 that is operatively connected to the motor's output shaft.

Linear actuator 20 comprises a first horizontal band 30 that has a stored portion 30*a* that is vertically stacked in a helix in a first band magazine 32 under and around the rotor 22; and a second vertical band 34 that has a stored portion 34*a* that is horizontally stacked in a spiral in a second band magazine 36 located co-axially around the rotor. A casing (now shown) is installed about the gear wheel 28, the rotor 22 and the second band magazine 36, with a hole atop the casing allowing a vertical column 38 to be formed and to extend therethrough. Vertical column 38 is formed by an column portion 30*b* of the first band 30 and by an column portion 34*b* of the second band 34. The lower end of each band 30, 34 is always located in its respective magazine 32, 36, while the upper end of each band 30, 34 is fixedly attached to a load-bearing platform 40 that engages under the load to be vertically displaced.

When the rotor 22 is rotated with motor 26 in a first direction to extract vertical column 38 such that platform 40 will be lifted, an insertion pad 42 carried by rotor 22 outwardly of column 38 gradually forces the turns of the vertical band 34 radially inwardly into a helical configuration towards and between two vertically successive turns of the horizontal band 30; and simultaneously, a helical groove 44 in rotor 22 located inwardly of vertical band 34 gradually lifts the turns of the horizontal band 30 such that the column portion 30*b* of horizontal band 30 radially abuts against the overlapping respective upper and lower edges of two successive turns of the column portion 34*b* of vertical band 34. Additionally, teeth 46 located on the outer periphery of the column portion 30*b* of horizontal band 30 engage holes 48 in the overlapping fringes or edges of the vertical band 34 to releasably interlock each pair of successive turns of the column portion 34*b* of vertical band 34. Consequently, as the turns of both the horizontal and vertical bands 30, 34 migrate from their stored portions into their column portions, the vertical telescopic column 38 is gradually extracted.

Telescopic column 38 can be retracted by rotating rotor 22 with motor 26 in the opposite direction such that platform 40 will be lowered. The turns of vertical and horizontal bands 30, 34 will then gradually release one another and be guided separately into their respective magazines 32, 36.

As shown in FIG. 8, the two lowermost turns 30''' and 30'''' of horizontal band 30 that form column 38 engage the two lowermost turns 44'' and 44''' of groove 44 that are vertically wider such that the horizontal band 30 is not supported by groove 44 at that point yet. The purpose of the lowermost turns 44'' and 44''' of groove 44 is to guide the horizontal band 44 from its stored portion towards its column portion, i.e. to allow the horizontal and vertical bands 30, 34 to become aligned and interlocked to form column 38 without yet supporting any load, or by supporting a relatively lower load compared to the upper turn 30'' that engages rotor 22. This alignment and interlocking relationship of bands 30, 34 is further achieved by the lowermost turn 34'''' of vertical band 34 being horizontally guided by insertion pad 42 such that the horizontal and vertical bands 30, 34 are sandwiched between insertion pad 42 and rotor 22. More particularly, insertion pad 42 applies a first horizontal force H1 against the lowermost turn 34'''' of vertical band 34 that forms column 38, which horizontal force is countered by two opposite forces H2 and H3 at the inner wall 44*c* of groove 44 against the two lowermost turns 30''' and 30'''' of horizontal band 30 that are part of column 38, with (H2+H3)=H1. This not only allows bands 30, 34 to engage one another, it also allows column 38 to be horizontally stabilized against the force of insertion pad 42 itself, but also against any lateral or transverse loads that might be applied against column 38, including through loads that might be off-centered relative to the vertical axis of column 38.

As further shown in FIG. 8, the load of column 38 itself and, more importantly, the load of any article (not shown), including any item or structure, that is supported and vertically displaced by column 38, is vertically transferred through the successive turns of the column portions 30*b*, 34*b* of bands 30, 34. More specifically, in each turn of horizontal band 30 that is not supported by rotor 22, the load of column 38 is transferred through one turn 34' of vertical band 34 to the turn 30' of horizontal band 30 as shown by force F1; and is countered by the reaction force F2 from the vertically adjacent underlying turn 34'' of vertical band 34 to which it is transmitted.

The two turns 34', 34'' of vertical band 34 on each turn 30' of horizontal band 30 that is not supported by rotor 22 will apply a shearing force on the horizontal band 30. This is a first mechanical stress induced transversally in the horizontal first band 30, approximately equally on each turn of the column portion 30*a* of first band 30.

The load of column 38 is transferred to rotor 22, from the uppermost turn 30'' that engages the groove 44 of rotor 22, to rotor 22. More particularly, the load supported by vertical column 38 is transferred to the uppermost turn 30'' of horizontal band 30 as shown by force F3. With this turn 30'' of horizontal band 30 being cantilevered in groove 44, this results in two main resultant reactions forces R1 and R2 concentrated punctually: the first resultant force R1 will be generated at the lower wall 44*a* of groove 44 near the outer edge, and the second resultant force R2 will be generated at the upper wall 44*b* near end wall 44*c*. This will effectively result in a torsional force being induced on the rotor-supported turn 30'' of horizontal band 30, with a slight deformation thereof, locally at this rotor-supported turn 30''. This is a second mechanical stress induced in first band 30, albeit, since the turns of horizontal band 30 forming column portion 30*b* move up and down and only the turn that is supported by rotor 22 is affected in this case, this torsional stress on horizontal first band 30 will not be the same along the entire length of the column portion 30*b* of first band 30, it will vary. This variable torsion will in turn generate fatigue on horizontal band 30, requiring horizontal band 30 to be mechanically overdesigned (i.e. mechanically more resistant) to counter this fatigue.

The load of column 38 may also be partly transmitted to rotor 22 through the other two turns 30''' and 30'''', but to a lesser extent than it is through the uppermost turn 30'' that engages rotor 22.

SUMMARY OF THE INVENTION

The present invention relates to a linear actuator comprising:

- upper and lower frame portions vertically movable relative to one another along a central axis;
- an elongated first band wound in helical form about said central axis;
- an elongated second substantially flat band wound on itself, with its turns substantially transversely parallel to said central axis;
- said first band having a stored portion where it is separate from said second band, and a column portion where it engages said second band;
- said second band having a stored portion where it is separate from said first band with its turns nested within one another, and a column portion with its turns forming a helix around said central axis and generally equally radially spaced therefrom, and where it engages with the column portion of said first band to form a wall of a vertical column;
- said column portions of said first and second bands each having an end attached to one of said upper and lower frame portions;
- a horizontal guide member carried by the other one of said first and second frame portions than that to which said ends of said column portions of said first and second bands are attached, said horizontal guide member horizontally guiding turns of said second band between said stored portion and said column portion;
- a second band support carried by said lower frame portion, said second band support vertically supporting said second band column portion for supporting the load of said column; and
- a powered activation mechanism carried by one of said upper and lower frame portions that causes relative rotation of:
  - on the one hand, said horizontal guide member; and
  - on the other hand, said first and second bands, to selectively extract and retract said column.

In one embodiment, said ends of said column portions of said first and second bands are attached to said upper frame portions, said first and second bands do not rotate relative to said upper and lower frame portions, said horizontal guide member is rotatably carried by said lower frame portion and said powered activation mechanism is carried by said lower frame portion to cause rotation of said horizontal guide member.

In one embodiment, said second band support is also rotatably carried by lower frame portion.

In one embodiment, it is a lower turn of said column portion of said second band that engages said second band support.

In one embodiment, said horizontal guide member comprises an insertion member for forcing said second band from said stored portion into said column when said column is extracted, and a reaction member to counter the horizontal pressure of said insertion member against said column.

In one embodiment, said insertion member, said reaction member and said second band support are carried by a rotor that is rotatably carried by said lower frame portion.

In one embodiment, said insertion member is an insertion pad carried by said rotor spacedly outwardly of said reaction member, with said first band abutting horizontally against said reaction member to counter horizontal pressure by said insertion pad against said second band.

In one embodiment, said second band support is a flange provided on said rotor that projects radially away from said central axis.

In one embodiment, said rotor comprises a helical groove engaged by said first band, for stabilizing said column by preventing said first band to move away from said lower frame portion.

In one embodiment, said first band comprises a number of teeth extending radially away from said central axis that engage, in said column portions of said first and second bands, openings provided on overlapping upper and lower fringes of said second band, to releasably interlock with said first band column portion successive turns of said second band column portion.

DETAILED DESCRIPTION OF THE EMBODIMENTS

Figure 1:
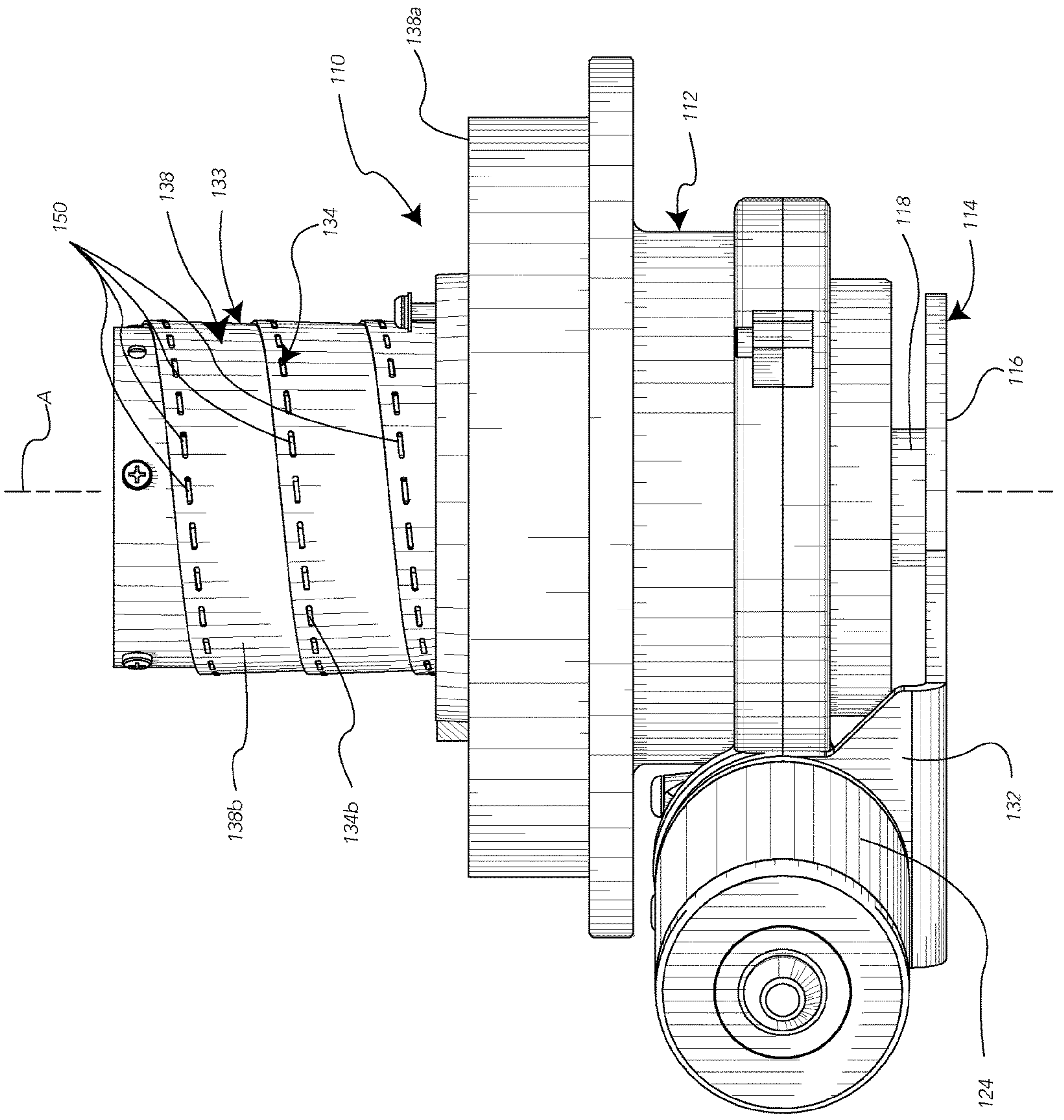
FIG. 1 is a side elevation of a linear actuator according to the present invention with the first and second bands partly extracted to form a vertical column.
Figure 2:
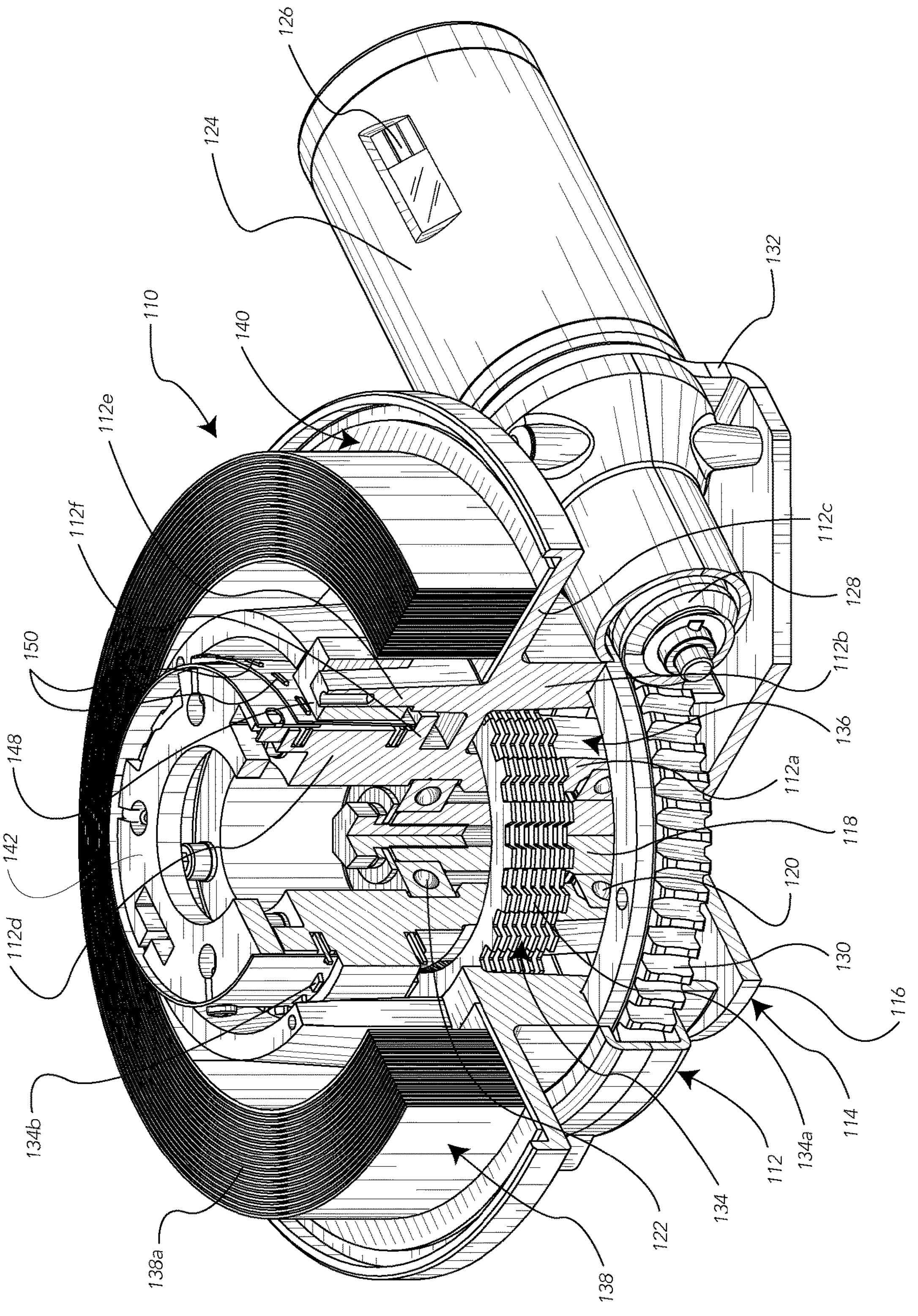
FIG. 2 is a partly broken perspective view showing the linear actuator of FIG. 1, albeit with the first and second bands being mostly retracted such that the vertical column itself is in its lower limit position.
Figure 3:
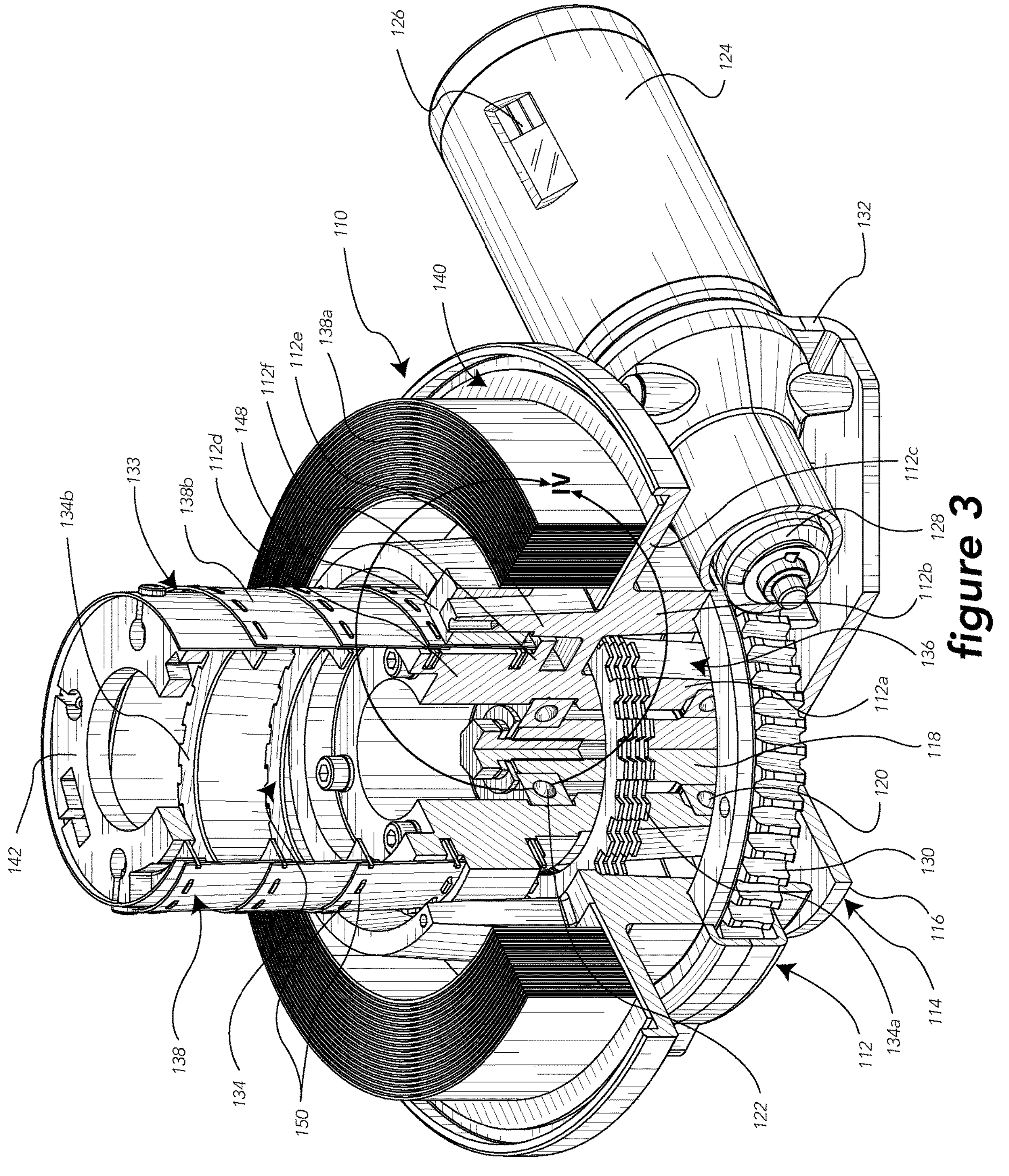
FIG. 3 is similar to FIG. 2, but with the first and second bands being partly extracted to form the vertical column.
Figure 4:
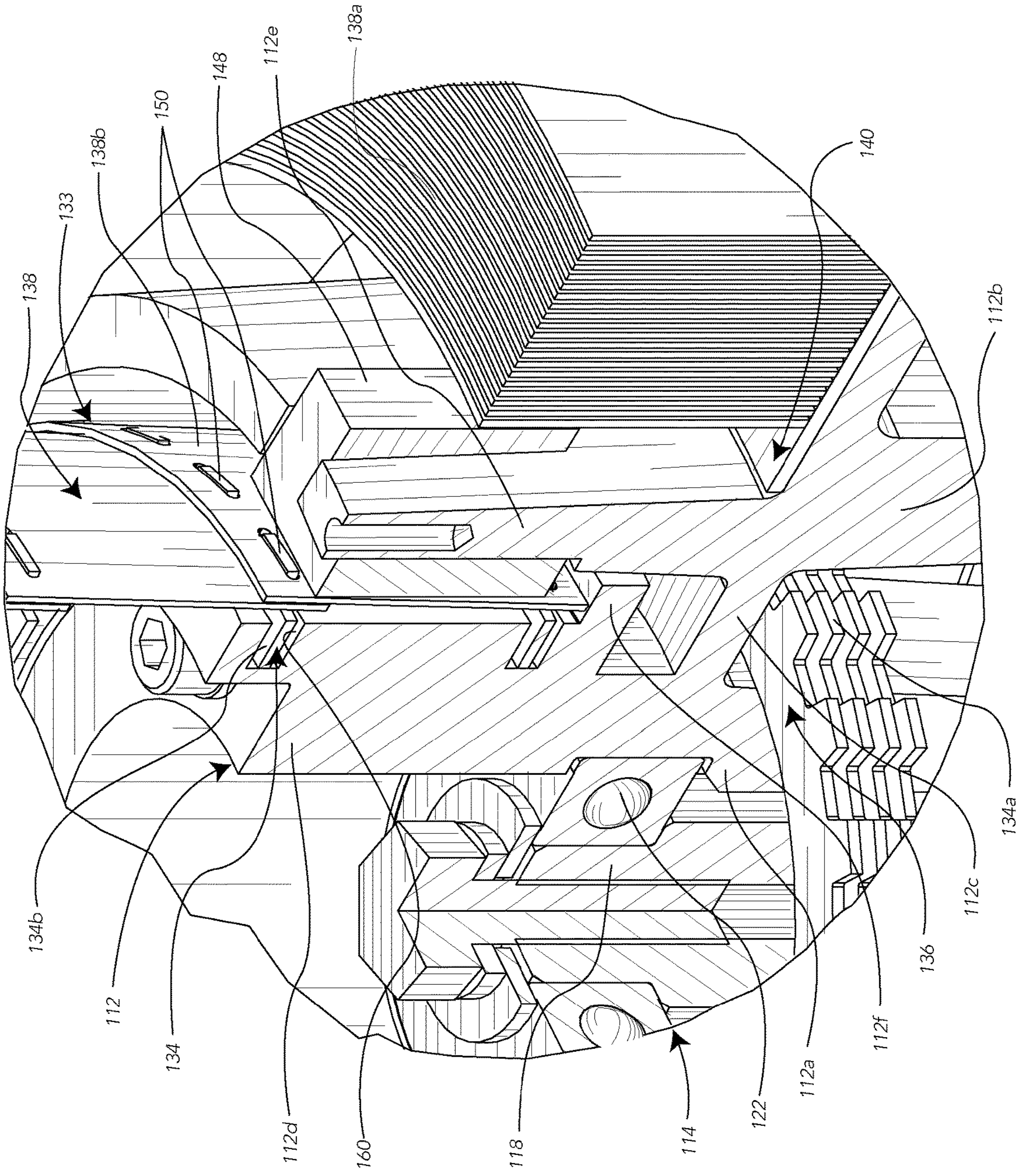
FIG. 4 is an enlarged view of the area circumscribed by circle IV in FIG. 3.

FIGS. 1-5 show a linear actuator 110 according to the present invention that is used to displace a load (not shown) along a vertical axis A. Linear actuator 110 comprises a hollow rotor 112 rotatably carried over a base 114 that is intended to rest on, and be fixed to, the ground. Base 114 includes a flat base plate 116 and a central post 118 upstanding from base plate 116. High capacity bearings 120, 122 allow rotor 112 to be rotatably carried by post 118. A generally tubular casing (not shown in the drawings to show the inner components of linear actuator 110) is attached to base 114 and generally covers most of the outer periphery of rotor 112.

Rotor 112 comprises inner and outer radially spaced-apart lower segments **112*a*, 112*b* that are attached to and project downwardly from a horizontal segment 112*c*. Rotor 112 also comprises inner and outer upper radially spaced-apart segments 112*d*, 112*e* that are attached to and project upwardly from horizontal segment 112*c*. A column support segment 112*f* that forms a helical flange is attached to and extends outwardly away from inner upper segment 112***d*—greater detail is provided below regarding column support segment 112*f* of rotor 112.

A powered activation member in the form of a motor 124 with a suitable control panel 126 selectively rotates the rotor 112 by means of pair of interconnected gear wheels 128, 130 that are respectively attached to motor 124 and to outer lower segment 112*b* of rotor 112. Motor 124 is carried by a bracket 132 fixed to base plate 116.

Linear actuator 110 comprises an extractable and retractable column 133 formed with a first band 134 that is used to releasably interlock the successive turns of a second band 138 and to transfer the load from one turn of the second band 138 to the next, with the second band forming the wall of the column 133.

First band 134 has a stored portion 134*a* that is stacked in a helix and stored in a first band magazine 136 that is formed within rotor 112. More specifically, first band magazine 136 is the space located above base plate 116, under rotor horizontal segment 112*c* and between the two rotor lower segments 112*a*, 112*b*.

Second band 138 has a stored portion 138*a* that is stacked in a spiral and stored in a second band magazine 140 that is also formed within rotor 112. More specifically, second band magazine 140 is located above rotor horizontal segment 112*c* and radially outwardly of rotor outer upper segment 112*e*. Second band magazine 140 is further provided interiorly of the above-mentioned casing (which is not shown).

Both first band and second band magazines 136, 140 are ring shaped, with the second band magazine 140 being diametrically wider than the first band magazine 136. First band 134 and second band 138 have respective column portions 134*b* and 138*b* that are arranged to form the column 133 as detailed hereinafter. As the column 133 gradually extracts or retracts, the length of each first and second band column portion 134*b*, 138*b* changes, in an inversely proportional way than the length of their stored portions 134*a*, 138*a* changes.

The upper end of each band 134, 138 is fixedly attached to a load-bearing member 142 that engages the load (not shown) to be lifted or lowered by linear actuator 110. A suitable attachment member (not shown) will attach load-bearing member 142 to the load.

Rotor 112 comprises a second band guide member in the form of a second band insertion pad 148 carried radially inwardly by rotor outer upper segment 112*e*.

When rotor 112 is rotated to extract or retract column 133, each turn of the second band 138 is guided by insertion pad 148 between second band magazine 140 and column 133 where it is disposed in helical configuration such that the upper fringe of each of its successive turns overlaps the lower fringe of the upwardly adjacent turn. Concurrently, when rotor 112 rotates, each turn of the first band 134 is guided between first band magazine 136 and column 133 where teeth 150 located on the outer periphery of the first band 134 engage openings 152, 154 (FIG. 5) that are respectively located on the overlapping upper and lower fringes of second band 138 to releasably interlock each two successive turns of the column portion 138*b* of second band 138. The wall of the column 133 is consequently formed by the column portion 138*b* second band 138, while the teeth 150 of the first band 134 cooperate with the openings 152, 154 of the second band 138 to interlock the successive turns of the column portion 138*b* of the second band 138 and to transfer the load between each to successive turns of the second band 138. When column 133 is extracted, first band 134 is guided from magazine 136 into column 133 by the releasable engagement of its teeth 150 with second band 138, i.e. it is second band 138 that pulls on first band 134.

The load carried and displaced by linear actuator 110 is transferred in a direction parallel to vertical axis A, in order, to load-engaging member 142, then through each successive first and second band turns of the first and second band column portions 134*b*, 138*b*, and then to rotor 112—as detailed hereinafter—and finally, through bearing 120, 122, to ground-resting base 114 and to the ground.

Figure 5:
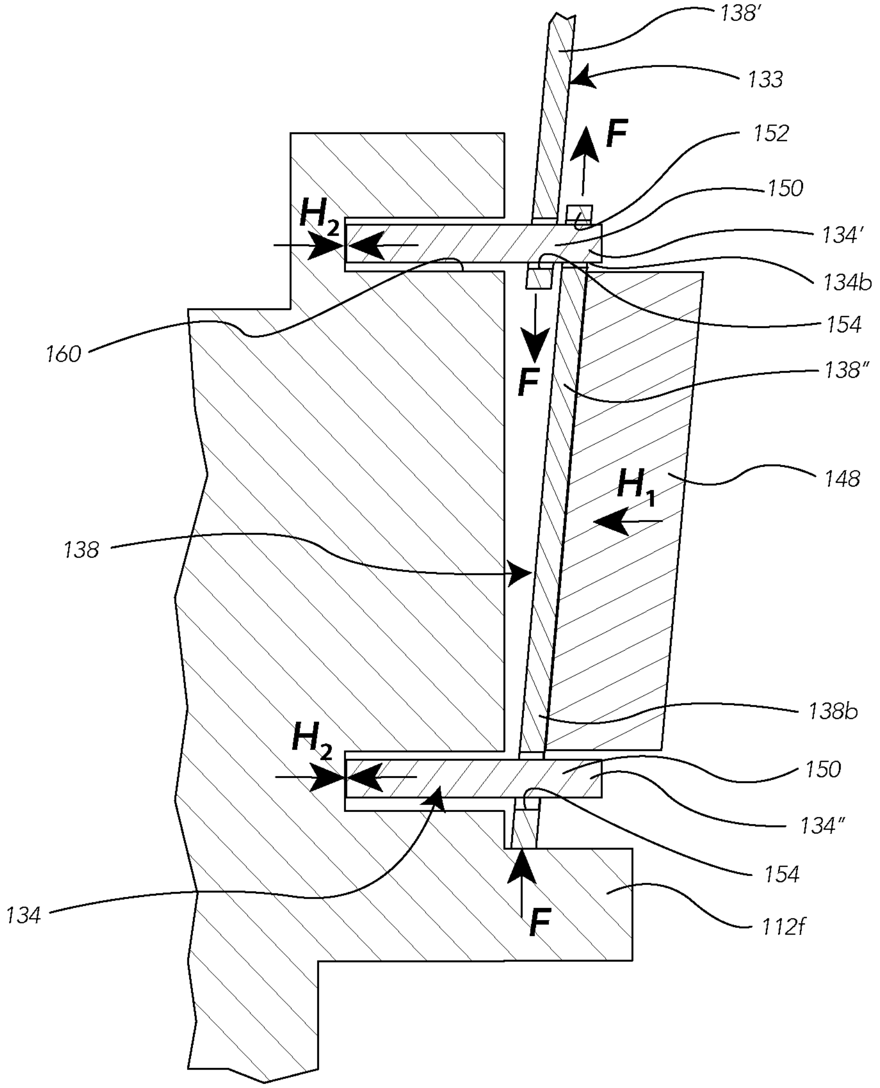
FIG. 5 is an enlarged schematic cross-sectional elevation showing the bottom portion of the vertical column and a portion of the outer periphery of the rotor, suggesting the forces that are transferred from the column to the rotor.
Figure 6:
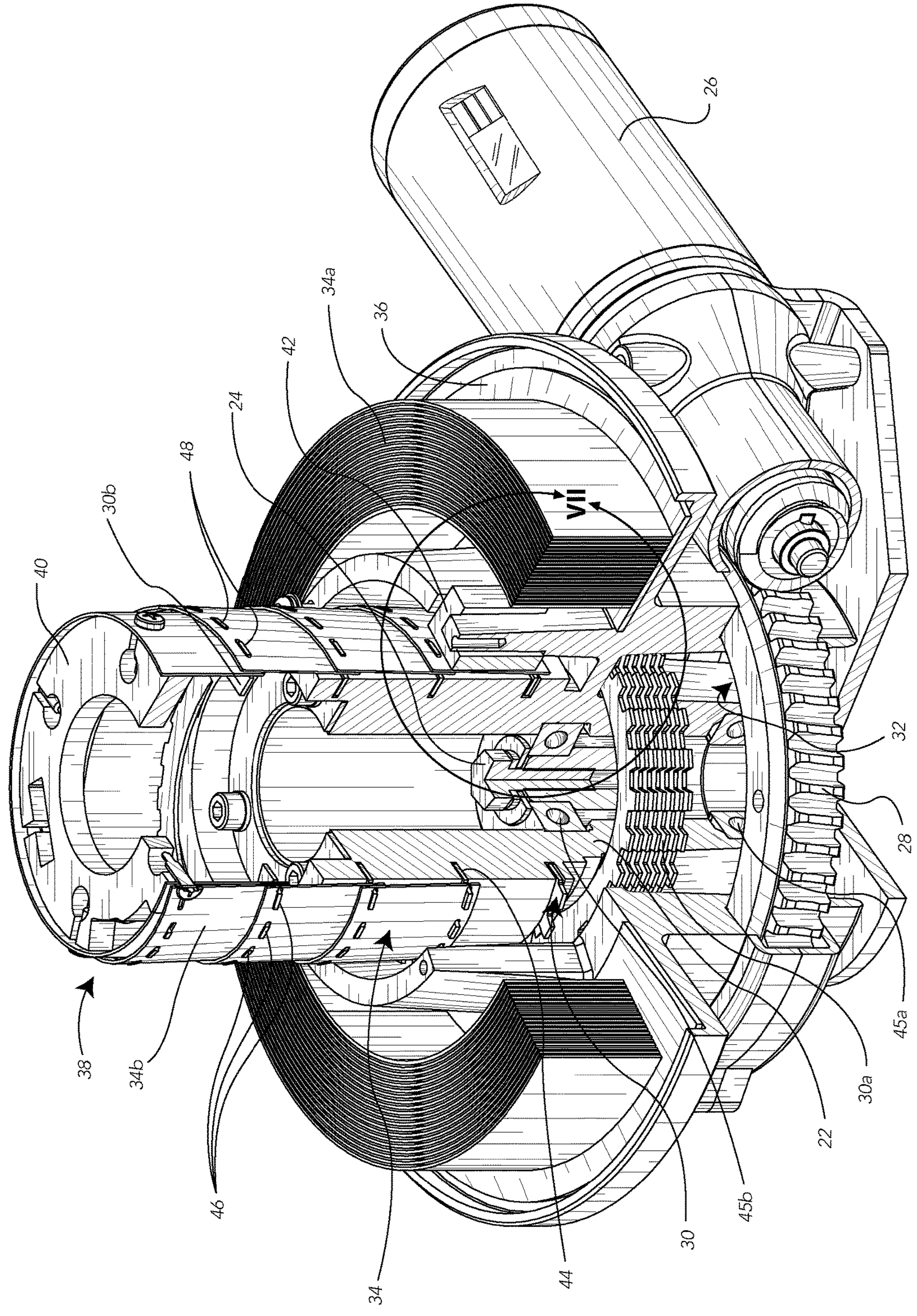
prior art figure 6
FIGS. 6, 7 and 8 are similar respectively to FIGS. 3, 4 and 5 but instead showing a prior art linear actuator.
Figure 7:
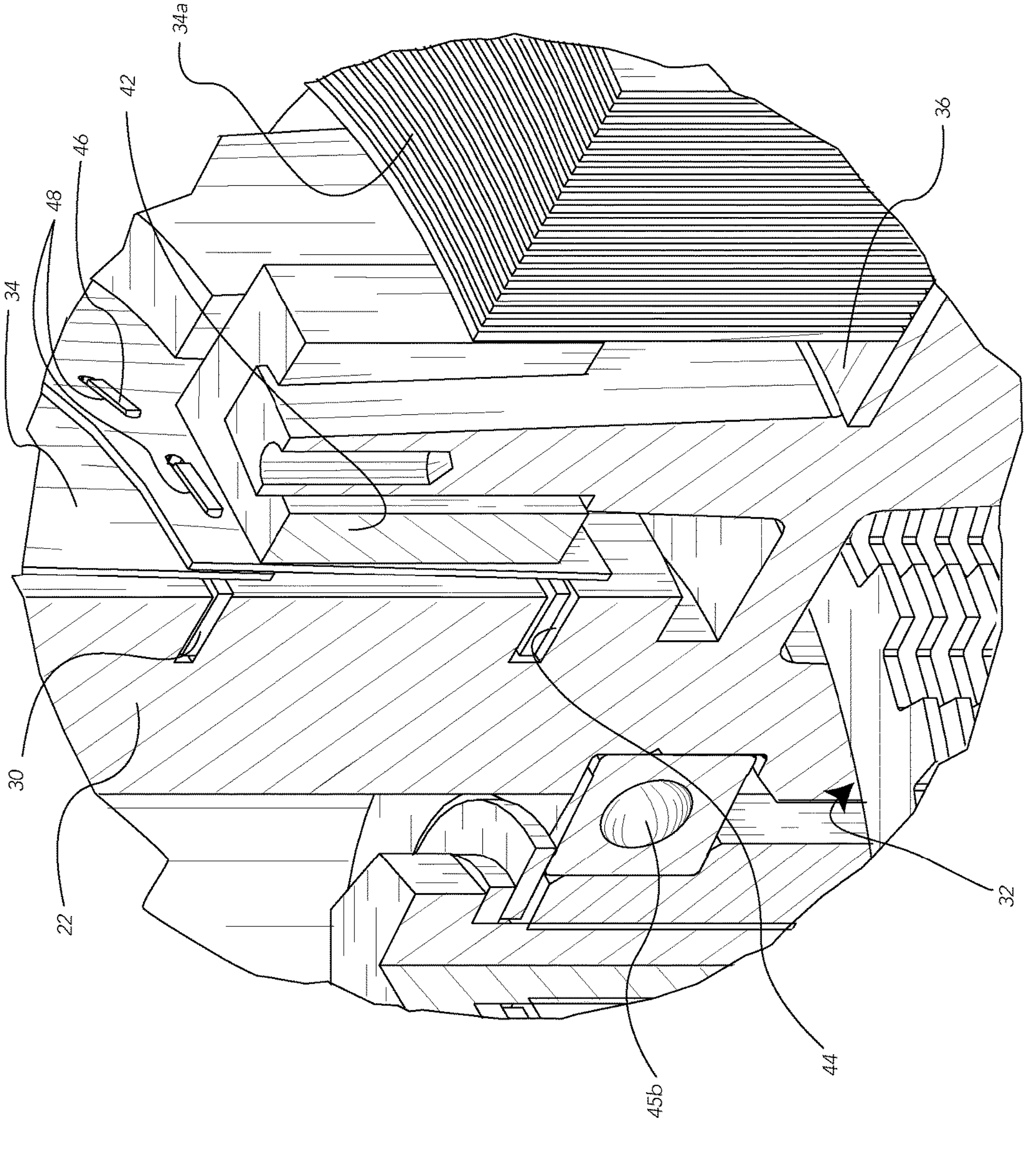
prior art figure 7
Figure 8:
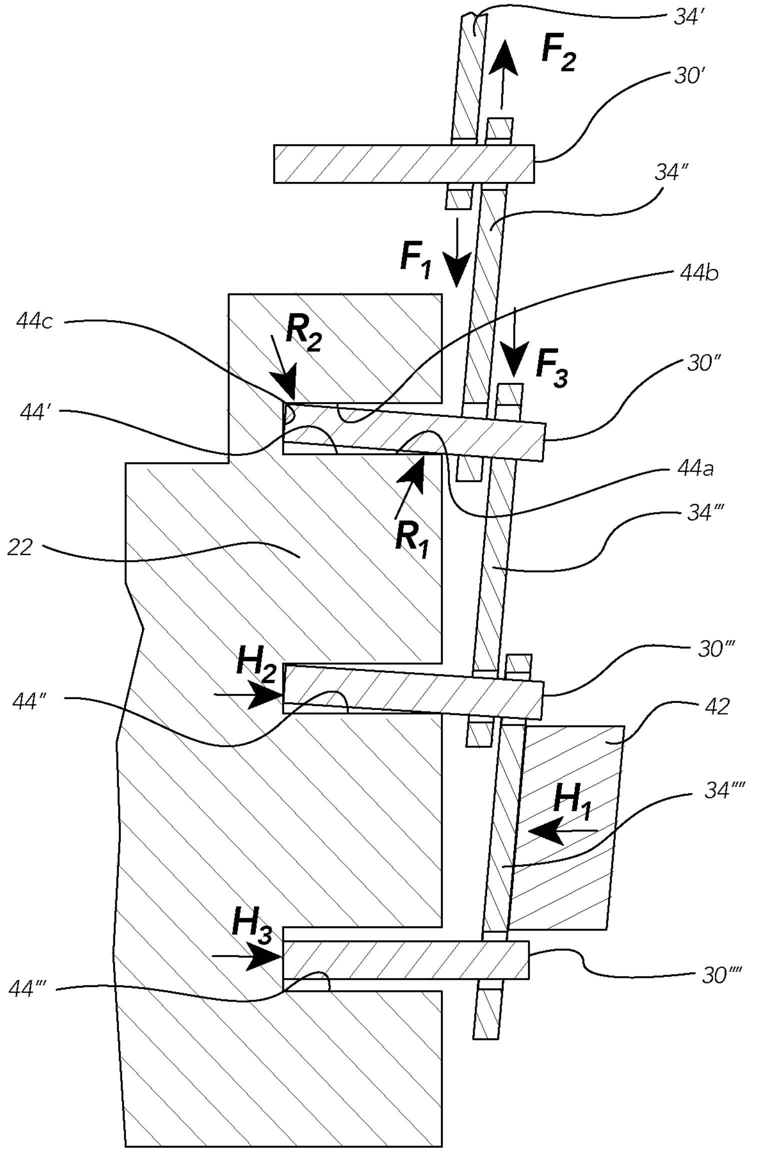
prior art figure 8

It can be seen more particularly from FIG. 5, that according to the present invention, the load of the column and, importantly, the articles (not shown) that are carried and vertically displaced by the column 133, are ultimately transmitted to rotor 112 by the vertical band 138, as opposed to being transmitted to rotor 112 by the first band as was the case in prior art devices such as the one shown in FIG. 6-8. Indeed, although the vertical force F that represents the load of the column, is transmitted from one turn of second band 138' to the next 138" through a corresponding turn of the first band 134', the lowermost turn 138" of the second band however rests directly on the horizontal column support segment 112*f* of rotor 112 and this is where the load of the column 133 and any article carried by it is transferred to rotor 112.

As per the prior art devices, there is a shearing force induced in the turns of the column portion 134*b* of first band 134 resulting form the transmittal of the vertical force F from one turn of the column portion 138*b* of second band 138 to the next. This shearing force however is approximately equal in all turns of the column portion 134*b* of horizontal band 134.

The first band 134 will also abut radially inwardly against an outer surface of the rotor's main body 112*d*. Indeed, the insertion member 148 is used as a horizontal guide member for forcing the second band 138 from its stored portion 138*a* into the column 133 when the column 133 is extracted, and the rotor's upper vertical segment 112*d* is used as a reaction member to counter at H2 the horizontal pressure H1 of the insertion member against the column 133. It is noted that a reaction member could apply horizontal pressure against the second band 138 instead.

Rotor 112 is shown to include a helical groove 160 engaged by the first band 134. Since the support of the load of the column 133 is not achieved through the first band 134 resting on the rotor 112 as in the prior art, this helical groove is optional. Providing helical groove 160 allows to stabilize column 133 by preventing the first band to accidentally move away from base 114. Indeed, if the load being carried and vertically displaced by be column 133 were to be accidentally pulled, or if the load accidentally tilted laterally such that the column 133 was forced to bend, the engaging of the first band 134 in groove 160 would help prevent that undesirable effect which might otherwise cause the column 133 to unravel and collapse.

One particular advantage of the present invention is consequently that, by transferring the load being carried and vertically displaced by column 133 from the vertical second band 138 directly to rotor 112, the local cantilevered force that was previously present in the prior art devices (such as in FIGS. 6-8) in the single rotor-supported turn of the column portion 134*b* of first band 134 is not present at all in the embodiment of the present invention. This results in the first band 134 not being subjected to a corresponding fatiguing force as the column 133 is repeatedly retracted and extracted like it was in the prior art, allowing the column 133 to be designed and built with a first band 134 having a lesser structural resistance, meaning a reduction in cost. This is not trivial, considering that the loads carried and vertically displaced by linear actuators such as the linear actuator 110 of the present invention can weight in the thousands of kilograms, which requires many of the components including the horizontal band 134 to be built with stringent mechanical requirements. Any significant relaxation of these requirements, as is the case with the improvement of the present invention, results in significant cost reduction.

The second band 138 being used to support the load carried and displaced by column 133 will not suffer the same fatigue as the horizontal first band did in prior art devices: indeed, the load is transmitted through vertical band 138:

a) Is in a direction that is approximately vertical, i.e. approximately aligned with the second band's cross-section. This direction is of course much more resistant, compared to being applied transversally as was the case with the horizontal first band in the prior art; and b) Approximately equally on all turns of the second band including the lowermost turn where it is transmitted to the rotor 112.

This is different than in the prior art, where the load was ultimately transferred from the first band to the rotor, and where the load would be transferred from the turn (or few turns) of the first band to the rotor (a) in a direction that is transversal to the first band's cross-section; and (b) unequally on all turns, because the turn (or few turns) that rests on the rotor is subjected to the cantilevered forces as described with respect to FIG. 8.

One further advantage of having the configuration according the invention shown in FIGS. 1-5, is that by having the load of the column 133 being supported by only the lowermost turn of the column portion 138*b* of the second band 138, it is not necessary to have three turns of the first band engage the rotor as was the case in the prior art. Only two turns of the first band 134 can engage the rotor. See FIG. 8 vs. FIG. 5. Thus, the rotor 112 and the entire base 114 can be more compact, which is a significant advantage since the clearance required to install the linear actuator 110 under the load to be vertically displaced is then lessened.

Generally, the invention relates to a linear actuator that comprises upper and lower frame portions that are vertically movable relative to one another along the central vertical axis A. In the embodiment shown in the drawings, the lower frame portion comprises base 114 and the upper frame portion comprises load-bearing member 142. Any suitable activation mechanism allowing the relative movement of the two frame portions may be used, including a motor such as the one shown in the drawings.

In one embodiment (not shown), the activation mechanism could be provided on the upper frame portion instead of on the lower frame portion (see for example the embodiment shown in FIGS. 9 and 9A of U.S. Pat. No. 7,213,796 issued to the present applicant).

The second band guide member could be provided either on the upper or lower frame portions, i.e. on the opposite frame portion relative to that where the activation mechanism is located.

In one embodiment, the horizontal guide member guiding the vertical band between its stored and column portions is fixed, and the first and second bands are rotated, instead, to selectively extract and retract the column. I.e. it is the rotation of the horizontal guide member relative to the first and second bands that allows the column to extract and retract; but either one or both of these elements could rotate relative to the base.

In one embodiment (not shown), no teeth are provided, and the second band rests centrally on the first band.

The invention claimed is:

1. A linear actuator comprising:

upper and lower frame portions vertically movable relative to one another along a central axis;

an elongated first band wound in helical form about said central axis;

an elongated second substantially flat band wound about said central axis, with its turns substantially transversely parallel to said central axis;

said first band having a stored portion where said stored portion is separate from said second band, and a column portion where said column portion engages said second band;

said second band having a stored portion where said stored portion is separate from said first band with its turns nested within one another, and a column portion with its turns forming a helix around said central axis and generally equally radially spaced therefrom, and where said column portion engages with the column portion of said first band to form a wall of a vertical column;

said column portions of said first and second bands each having an end attached to one of said upper and lower frame portions;

a horizontal guide member carried by the other one of said upper and lower frame portions than that to which said ends of said column portions of said first and second bands are attached, said horizontal guide member horizontally guiding turns of said second band between said stored portion and said column portion;

a second band load-bearing member carried by one of said upper and lower frame portions, said second band load-bearing member vertically engaging said second band column portion for vertically displacing the load of said column; and a powered activation mechanism carried by one of said upper and lower frame portions that causes rotation of:

said horizontal guide member relative to said first and second bands, to selectively extract and retract said column.

2. The linear actuator as defined in claim 1, wherein said ends of said column portions of said first and second bands are attached to said upper frame portion, said first and second bands do not rotate relative to said upper and lower frame portions, said horizontal guide member is rotatably carried by said lower frame portion and said powered activation mechanism is carried by said lower frame portion to cause rotation of said horizontal guide member about said central axis.

3. The linear actuator as defined in claim 2, wherein said second band load-bearing member is rotatably carried by said lower frame portion.

4. The linear actuator as defined in claim 3, wherein it is a turn of said column portion of said second band nearest said lower frame portion engages said second band load-bearing member.

5. The linear actuator as defined in claim 4, wherein said horizontal guide member comprises an insertion member for forcing said second band from said stored portion into said column when said column is extracted, and a reaction member to counter the horizontal pressure of said insertion member against said column.

6. The linear actuator as defined in claim 5, wherein said insertion member, said reaction member and said second band load-bearing member are carried by a rotor that is rotatably carried by said lower frame portion.

7. The linear actuator as defined in claim 6, wherein said insertion member is an insertion pad carried by said rotor spacedly outwardly of said reaction member, with said first band abutting horizontally against said reaction member to counter horizontal pressure by said insertion pad against said second band.

8. The linear actuator as defined in claim 6, wherein said second band load-bearing member is a flange provided on said rotor that projects radially away from said central axis.

9. The linear actuator as defined in claim 6, wherein said rotor comprises a helical groove engaged by said first band, for stabilizing said column by preventing said first band to move away from said lower frame portion.

10. The linear actuator as defined in claim 6, wherein said first band comprises a number of teeth extending radially away from said central axis that engage, in said column portions of said first and second bands, openings provided on overlapping upper and lower fringes of said second band, to releasably interlock with said first band column portion successive turns of said second band column portion.

* * * * *